Figure 1:
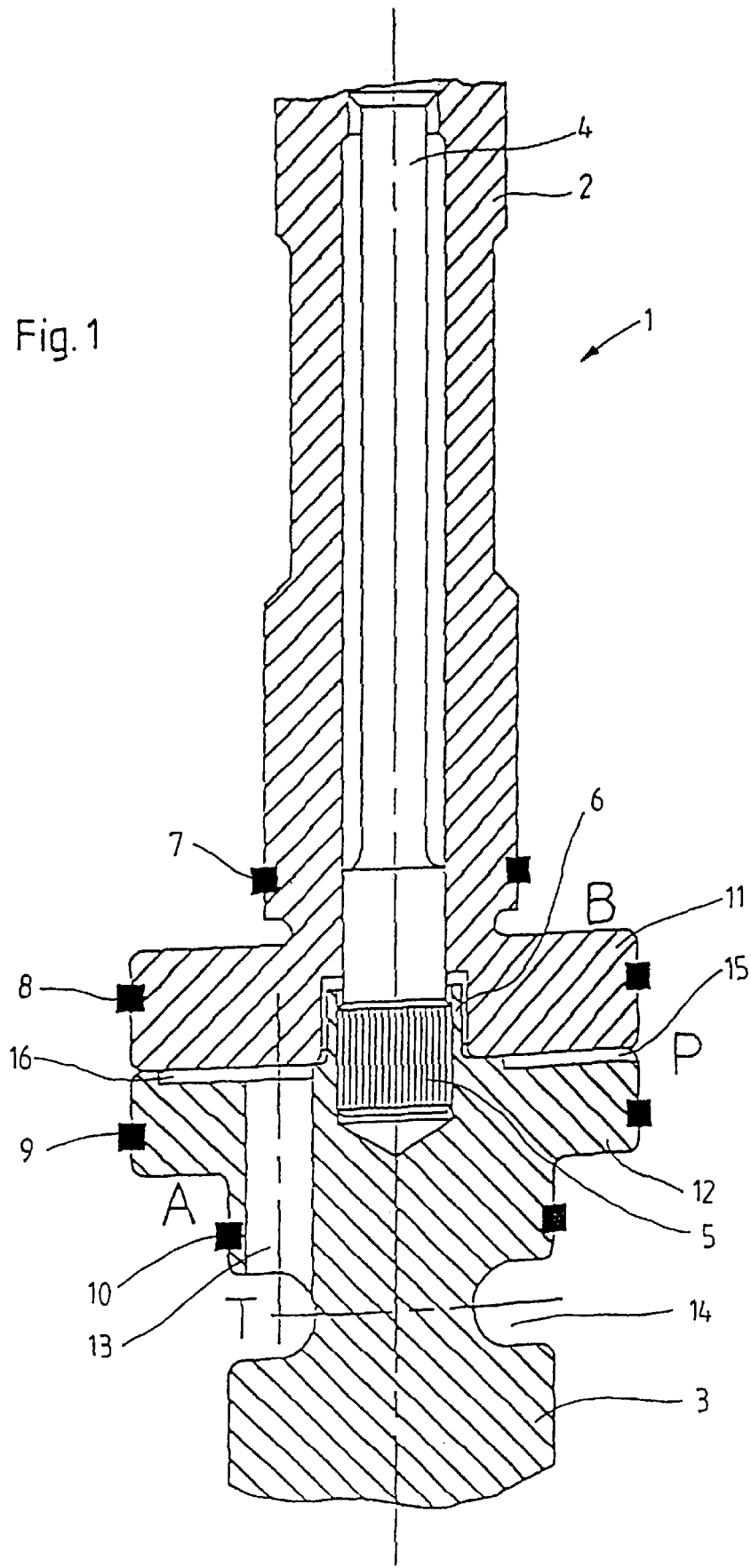

United States Patent [19]
Pfeifer

[11] Patent Number: 5,937,900
[45] Date of Patent: Aug. 17, 1999

[54] ROTARY SLIDE STEERING VALVE

[75] Inventor: Arnd Pfeifer, Willich, Germany

[73] Assignee: TRW Fahrwerksysteme GmbH & Co. KG, Dusseldorf, Germany

[21] Appl. No.: 08/894,323

[22] PCT Filed: Feb. 16, 1996

[86] PCT No.: PCT/EP96/00664

§ 371 Date: Nov. 17, 1997

§ 102(e) Date: Nov. 17, 1997

[87] PCT Pub. No.: WO96/25318

PCT Pub. Date: Aug. 22, 1996

[30] Foreign Application Priority Data

Feb. 17, 1995 [DE] Germany ............................. 195 05 384
May 20, 1995 [DE] Germany ............................. 195 18 637

[51] Int. Cl.⁶ .................................................... F15B 9/10
[52] U.S. Cl. ................................. 137/625.21; 91/375 A
[58] Field of Search ....................... 91/375 A; 137/625.21

[56] References Cited

U.S. PATENT DOCUMENTS

| | | | |
|---|---|---|---|
| 4,204,817 | 5/1980 | Kervagoret | 91/375 A X |
| 4,325,447 | 4/1982 | Dauvergne | 137/625.21 X |
| 4,369,695 | 1/1983 | Nishikawa et al. | 91/375 A |
| 4,414,883 | 11/1983 | Dauvergne | 91/375 A X |
| 4,421,191 | 12/1983 | Bertin et al. | 91/375 A X |
| 4,459,896 | 7/1984 | Dauvergne et al. | 91/375 A |
| 4,459,897 | 7/1984 | Barcardit | 91/375 A |
| 4,492,283 | 1/1985 | Bertin | 91/375 A X |

*Primary Examiner*—Gerald A. Michalsky
*Attorney, Agent, or Firm*—Tarolli, Sundheim, Covell, Tummino & Szabo

[57] ABSTRACT

A rotary slide steering valve (1) for supplying an actuator with hydraulic pressure, has an input shaft (2), an output shaft (3), a centering spring element (4) connected to the input shaft (2) and to the output shaft (3) and a valve element. The valve element comprises at least two elements that can be turned relative to one another and comprise control bores for supplying and returning a hydraulic medium as well as a hydraulic medium line to and a hydraulic medium return line from both sides of the actuator. All control bores of the valve element which are assigned to one another are exclusively arranged within a region of opposing end faces of the input shaft (2) and the output shaft (3) and directly connected to pressure medium connections on a housing side of the rotary slide steering valve. The input shaft (2) and the output shaft (3) comprise a disk-shaped widening (11, 12) within the region of the opposing end faces. Control recesses (15, 16, 17, 18) are arranged on the opposing end faces. The axial bores (13, 28, 29) are arranged in the opposing end faces.

10 Claims, 5 Drawing Sheets

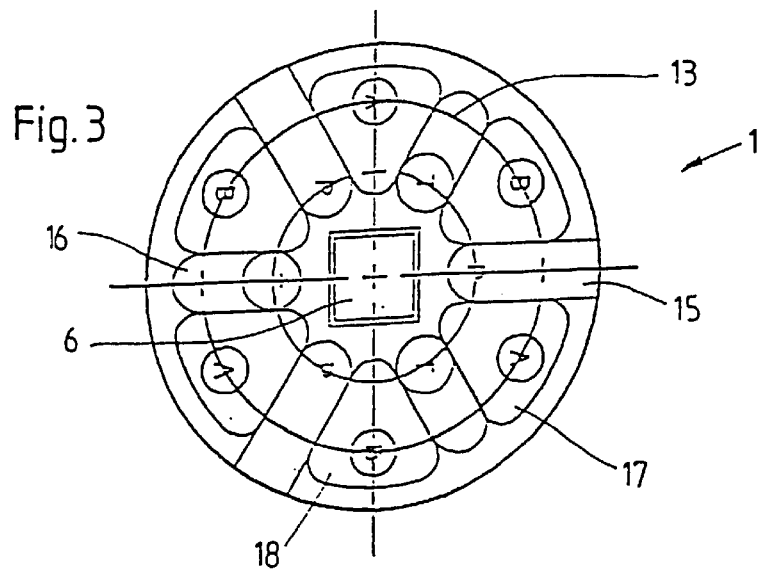
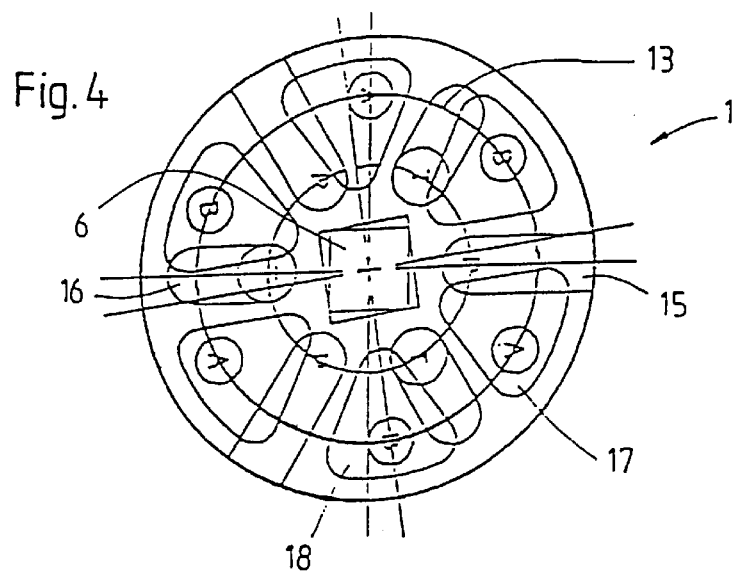
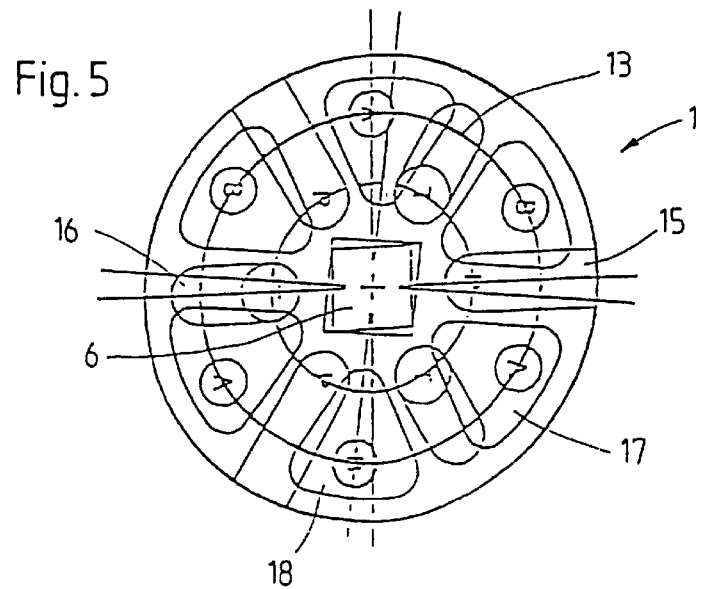

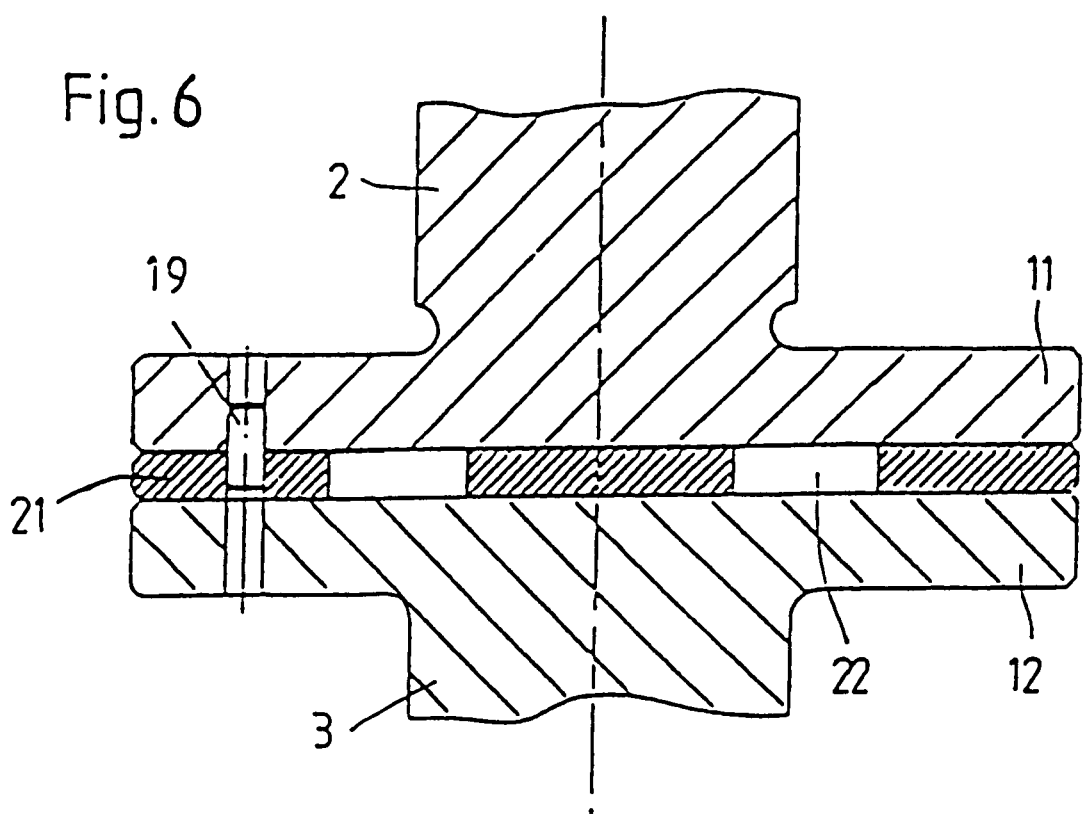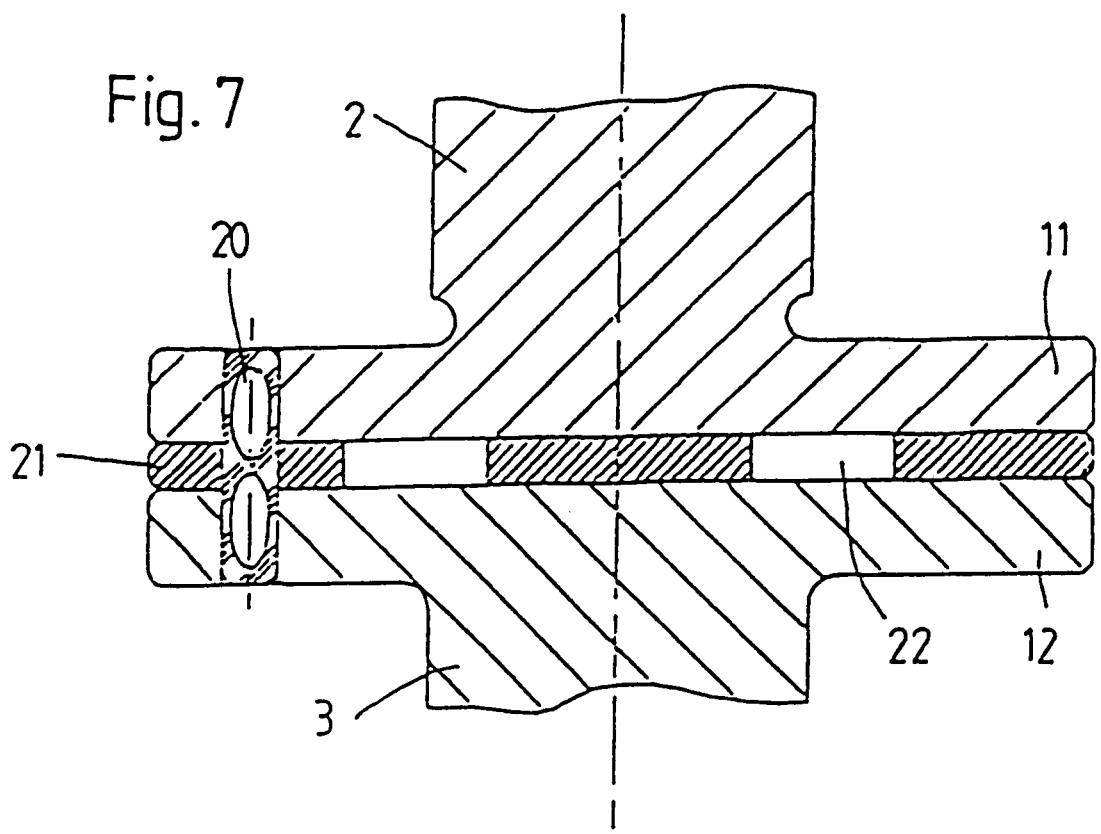

ROTARY SLIDE STEERING VALVE

The invention pertains to a rotary slide steering valve for supplying an actuator with hydraulic pressure which consists of an input shaft, an output shaft, a centering spring element and a valve element, wherein the valve element consists of at least two elements that can be turned relative to one another and comprise control bores for supplying and returning the hydraulic medium as well as the hydraulic medium line to and the hydraulic medium return line from both sides of the actuator.

Steering valves of this type are, in particular, used in power steering systems. The design of such power steering systems is generally known. An input shaft that is coupled to a steering rod is connected to an output shaft that is provided with a pinion via a centering spring element. The pinion acts on the toothed rack of the steering system. It is known to utilize steering valves in steering systems of this type. In this case, a conventional rotary valve element is provided which connects or disconnects hydraulic lines that end in bores when the input shaft is turned relative to the output shaft. Hydraulic fluid is pumped through the system under pressure by a pump. If the input shaft is turned relative to the output shaft, hydraulic pressure is supplied to a hydraulic motor that boosts the toothed rack movement in one of two possible directions.

Steering valves of this type are actuated by turning the input shaft relative to the output shaft. In this case, a torsional moment must be overcome by the centering spring element arranged between the input shaft and the output shaft, e.g., a torsion rod.

In one known steering valve of this type, a valve sleeve is provided which is engaged with the output shaft and surrounds the input shaft. This valve sleeve comprises control grooves that are moved such that they are situated congruently with bores for conveying the hydraulic medium which extend outside a housing in order to realize the control function.

In another type of rotary slide steering valve, bores that essentially extend in the axial direction are moved such that they are situated congruently.

One example of such a rotary slide steering valve is known from DE-OS 4,209,647. In this case, a sleeve that is connected to the input shaft is surrounded by a valve sleeve that is connected to the output shaft such that both sleeves overlap one another within the region of the annular surfaces that face one another. Bores that are connected to the hydraulic lines are arranged within the region of these annular surfaces in both sleeves. The bores can be arranged congruently or separated from one another by turning the input shaft relative to the output shaft, i.e., the corresponding lines are connected or disconnected. A servo control is realized in this fashion. Corresponding rotary slide steering valves are known from DE-OS 2,833,009 and DE-PS 4,232, 570.

Another steering valve which, however, is not realized in the form of a rotary slide steering valve is known from DE 1,101,187 A1, whereby the hydraulic medium is initially conveyed to corresponding grooves of the input shaft via a valve sleeve. An output line that ends within the region of the end face is either connected to a pressure line or a pressure relief line by turning the input shaft relative to the output shaft.

These known rotary slide steering valves require a number of additional components. Consequently, the structural size of the steering valve becomes excessively large and its manufacture is associated with high cost. Due to the valve sleeves, the conveyance of the pressure medium to the annular surfaces is quite difficult, i.e., it is frequently required to provide bores that are combined with one another several times or may be connected to one another by transversely extending channels. In a valve with a control sleeve, a minimum tolerance usually must be observed because the sleeve is deformed during the operation of the valve by the hydraulic pressure. This may lead to increased friction. Consequently, the previously mentioned manufacture of these rotary valves is quite complicated. Due to the adjustment of the elements that are moved relative to one another, the assembly is also associated with high cost, in particular, the arrangement of a corresponding hydraulic seal during the installation of the valve sleeve.

In known rotary valves with annular disks, the control edges on the annular surfaces are realized in the form of bores or elliptical recesses that lie on arcs of a circle. Consequently, a variable overlap of the circular bores that face one another results while the annular surfaces are turned relative to one another. This variable overlap is initially very small and continues to become larger as the annular surfaces are also turned relative to one another. It is known that the slight initial overlap of the control edges leads to loud flow noise that is frequently perceived as annoying by the operator.

Whether the valve element is realized with a valve sleeve or otherwise, known valve elements have the disadvantage that the control characteristics are not variable. This means that the control characteristics cannot be varied once the valve is manufactured, particularly in dependence on functional parameters. One additional disadvantage of conventional rotary slide steering valves can be seen in the fact that the automatic control of the vehicle can only be realized with a high control expenditure and a large number of components.

The present invention is based on the objective of improving a rotary slide steering valve of the initially mentioned type in such a way that it can be inexpensively and compactly manufactured with a small number of components. In addition, it should be possible to reduce the instructions on the required tolerances as well as the generation of flow noise.

This objective is attained by additionally developing a steering valve of this type in such a way that all control bores of the valve element which are assigned to one another are exclusively arranged within the region of the opposing end faces of the input shaft and the output shaft and directly connected to the pressure medium connections on the housing side.

Due to the design according to the invention, it is merely required to arrange opposing end faces on the input shaft and the output shaft in order to form the rotary valve element. Additional components are eliminated and the structural size is reduced. According to the present invention, all valve sleeves and the like which supply or distribute the pressure medium are eliminated due to the direct connection of the control bores to the pressure medium connections on the housing side. The pressure medium is supplied via the pressure medium connections on the housing side and conveyed to the control bores that are exclusively arranged within the region of the opposing end faces of the input shaft and the output shaft or conveyed from these control bores to the pressure medium connections on the housing side via corresponding bores, grooves and the like in the shafts. It goes without saying that additional elements, through which the pressure medium is conveyed, may be arranged within the region of the shafts. However, these elements do not fulfill a function that influences the hydraulic control, even if they render the conveyed pressure medium useful for other purposes. It is essential that a direct hydraulic connection exist between the connections on the housing side and the valve element formed within the region of the end faces of the shafts.

According to one advantageous embodiment of the invention, the opposing end faces are arranged in disk-shaped widenings of the input shaft and the output shaft. These disk-like widenings or cylindrical end pieces form a sufficiently large end face for accommodating the required control edges. Axial bores are advantageously arranged in both end faces so as to form the control edges. According to one particularly advantageous embodiment of the invention, these axial bores are connected to axial bores that form hydraulic lines. Due to the disk-shaped widening, these axial bores may be connected in the form of a direct axial extension of the supply lines, i.e., the conveyance of the pressure medium is significantly simplified.

It is particularly advantageous to arrange so-called control recesses on the end face, and within which the control bores are arranged. These control recesses make it possible to enlarge the control edges. According to one particularly advantageous embodiment, the control recesses comprise linear edges that essentially extend in the radial direction. It is practical that the edges of adjacent control recesses essentially extend parallel to one another. This embodiment of the invention provides the particular advantage that the essentially linear edges of the control recesses overlap if the end faces are turned relative to one another, i.e., a very large overlap can be attained from the beginning. This measure significantly reduces the flow noise.

Particular advantages of the rotary slide steering valve according to the invention which is realized in the form of an axial flow valve are the compact structural form as well as the reduced number of components. In contrast to conventional rotary slide steering valves, no valve sleeve is required. It is, for example, possible to manufacture the control grooves on the input shaft and the output shaft by means of cold forming. Due to the design according to the invention, the tolerances between the two valve components can be significantly reduced because no sleeve deformation takes place. Instead, in the rotary slide steering valve according to the invention, a pressure increase causes a reduction of the friction.

According to one advantageous embodiment of the invention, the relative turning angle between the input shaft and the output shaft is limited by a positive contour between the input shaft and the output shaft. It is, for example, possible to arrange elliptical or angular connecting regions between the input shaft and the output shaft. In this case, the receptacle openings are larger than the inserted pins such that a defined limitation of the turning angle is attained.

The rotary slide steering valve according to the invention may also be realized in different variations. It is, for example, possible to arrange a device that exerts a centering moment between both end faces. For example, spring-loaded balls that respectively engage into grooves of the other shaft may be inserted between the end faces in corresponding bores of the input shaft or the output shaft. The axial force generated by the spring-loaded balls and the centering moment are increased as a function of the turning angle. The invention advantageously proposes to realize this increase in the centering moment in adjustable fashion.

The steering valve according to the invention results in a significant reduction in the required components as well as a compact structural size because valve sleeves are no longer required. The conveyance of the pressure medium is significantly simplified and may be reduced to axial guide elements. The basic adjustment of the valve is significantly simplified and the tolerances can be reduced in comparison to conventional rotary valves. In addition, measures for reducing noise can be effectively utilized.

According to one particularly advantageous embodiment of the invention, at least one intermediate element with control bores is arranged between the two end face regions that form the valve element in order to allow a variation of the control characteristics of a rotary slide steering valve according to the invention as well as to simplify an automatic control of the motor vehicle. Due to this design according to the invention, a rotary slide steering valve that can be varied within the control bore/control groove transition region due to the arrangement of an intermediate element can be realized.

If the valve element is formed by bores that oppose one another in the axial direction and are arranged in end face regions that can be turned relative to one another, the corresponding intermediate element may, according to one particularly advantageous embodiment of the invention, be realized in the form of an intermediate disk. According to this embodiment of the invention, the control bores in the intermediate element are provided with different control grooves. Due to this measure, a control bore may be provided with different control grooves on both surface regions. In addition, one attains a different response behavior as a function of which control groove is active.

According to one particularly advantageous embodiment of the invention, the intermediate element can be connected to at least one region that forms the valve element. When using an intermediate disk, this region is either arranged in the input shaft or the output shaft. It is advantageous that this connection is produced in dependence on functional parameters. A mechanical actuator or a corresponding element may, for example, be used for this purpose. However, electrorheological media, friction, magnetism and the like may also be used. It is essential that the intermediate element be connected to one or the other region forming the valve element in dependence on functional parameters, e.g., the vehicle speed, the hydraulic pressure and/or the like. Consequently, it is possible to actuate the respective control groove situated on the free surface, i.e., the desired response behavior can be adjusted. For example, an intermediate disk or intermediate sleeve is rigidly connected to the input shaft during parking maneuvers and to the output shaft while driving at high speeds. Consequently, one attains a different characteristic for high speeds than for parking maneuvers. The intermediate element is advantageously adjusted by means of an adjusting element, preferably an adjusting ring. According to another advantageous embodiment of the invention, the intermediate element can be driven, e.g., by means of a motor operator. This measure makes it easily possible to realize automatic control due to the fact that the motor operator moves the intermediate element relative to the regions that comprise the control bores and/or control grooves.

According to another embodiment of the invention, a series of intermediate elements is used instead of only one intermediate element. This measure makes it possible to attain a finely tuned variation of the characteristic and/or an automatic control.

The invention provides a rotary slide steering valve that can be adapted to the control requirements in the best possible fashion and ensures the realization of automatic control.

Due to the utilization of an intermediate element with different control grooves or control edge progressions on the respective surfaces, it is possible to attain a different response behavior of the rotary slide steering valve as a function of which of the surfaces is rotatably held opposite to the other valve element region as the free surface.

The basic adjustment of the valve is significantly simplified and the tolerances can be reduced in comparison to conventional rotary valves. In addition, measures for reducing noise can be effectively utilized.

Figure 2:
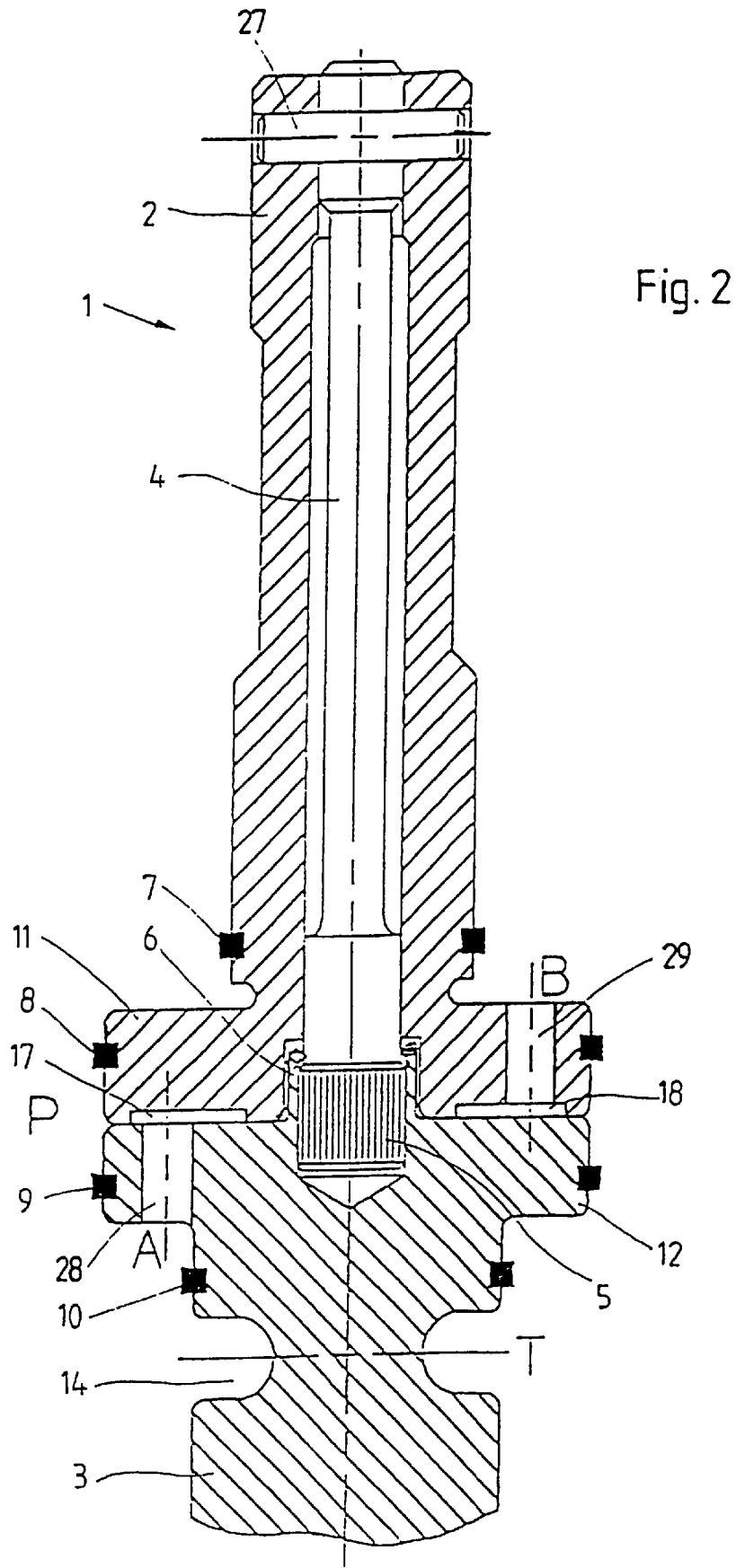
Figure 8:
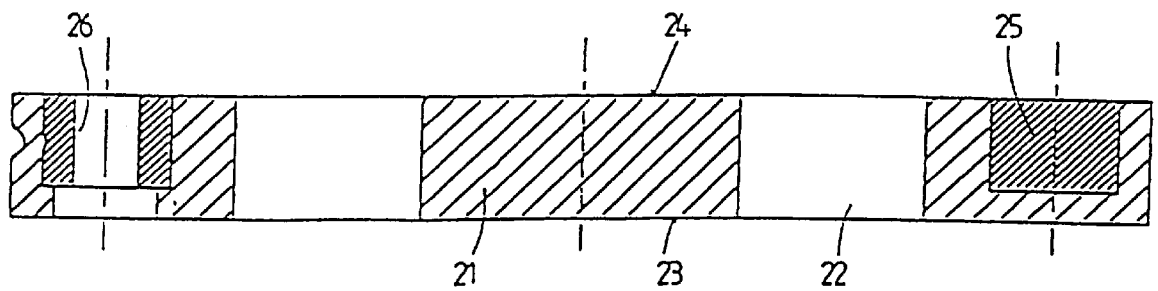

Additional advantages and characteristics of the invention are described below with reference to the figures. The figures show:

FIG. 1, a schematic representation in partial cross section of a steering valve;

FIG. 2, a representation according to FIG. 1 in another radial position;

FIG. 3, a schematic representation of the rotary valve in the neutral position;

FIG. 4, a representation according to FIG. 3 in a turned position;

FIG. 5, a representation according to FIG. 3 in another turned position;

FIG. 6, a partial representation of the region of the disk-shaped widenings in one embodiment of the invention;

FIG. 7, a representation according to FIG. 3 of another embodiment of the invention;

FIG. 8, a representation of an intermediate disk, and

Figure 9:
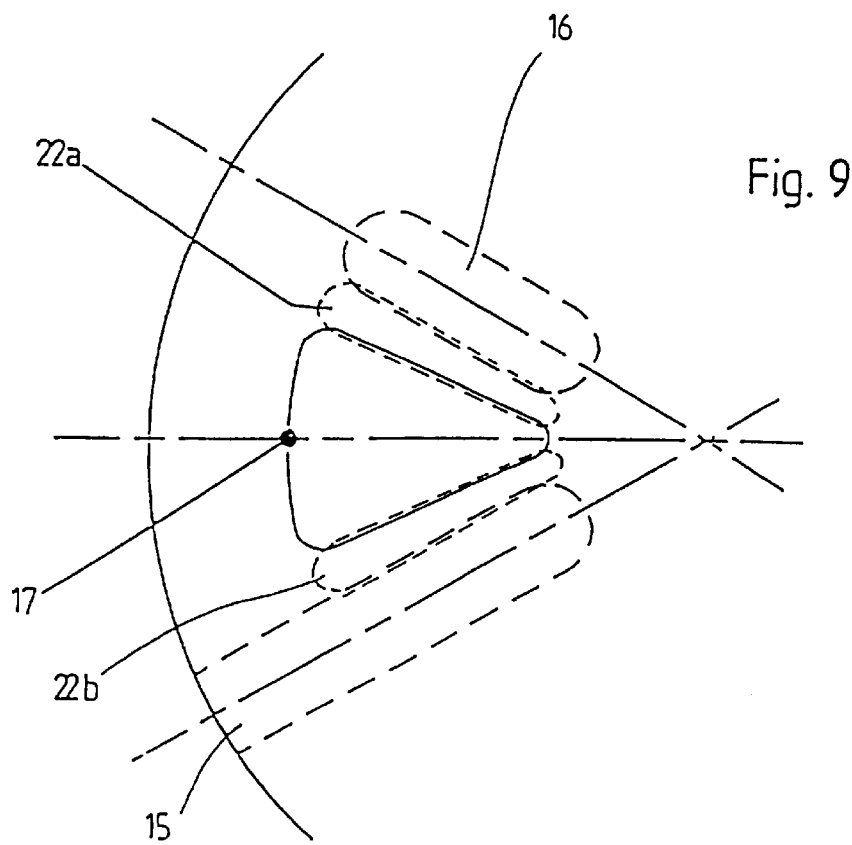

FIG. 9, a schematic representation of a rotary valve that utilizes an intermediate disk.

The steering valve 1 shown in the figures comprises an input shaft 2, an output shaft 3 and a torsion rod 4 as the centering spring element. One end of the torsion rod 4 is connected to the input shaft, with the other end connected to the output shaft. The connection 5 between the torsion rod and the output shaft is realized nonrotatably by means of a knurling. The output shaft protrudes into a corresponding bore of the input shaft with a central pin. FIGS. 3–5 show that this pin is square. The bore or recess in the input shaft is also square, but has a longer side. Consequently, the two shafts may be turned relative to one another until the limit stop is reached.

Seals 7, 8, 9 and 10 are arranged around the region of the rotary valve element. The input shaft is connected to a not-shown steering wheel, and the output shaft is provided with a not-shown pinion that, for example, is engaged with the toothed rack of the steering system.

In the region in which the end faces of the input shaft 2 and the output shaft 3 oppose one another, both shafts are provided with essentially congruent, disk-shaped widenings. Within the end face region, both widenings are provided with grooves 15, 16, 17, 18 that form the control grooves. These grooves are connected to corresponding pressure medium lines by means of axial bores 13, 28, 29.

The reference symbol P identifies the pressure supply region. In the embodiment shown, this pressure supply region is assigned to the annular space within the end face region. A not-shown housing is provided with a pressure supply line at this location. The pressure is conveyed to the intermediate end face region via grooves that extend radially outward. The reference symbol T identifies the tank return line that extends outward from the end face region via axial bores in the output shaft. The housing may be provided with a hydraulic connection for the tank return line at this location. In the embodiment shown, the output shaft is provided with an annular constriction so as to provide an outlet for the tank return bore. Reference symbols A and B identify the axial bores for the pressure supplied to both sides of an actuator. These bores are realized in the form of axial bores in the disk-shaped widenings and provided with corresponding control grooves. The pressure chambers A, B, P and T are separated from one another by seals 7, 8, 9 and 10.

FIGS. 3–5 show that the grooves or control recesses are realized in such a way that they comprise linear regions that essentially extend in the radial direction. FIG. 3 shows the steering valve in the neutral position. The control edges of the respective grooves lie adjacent to one another. In FIG. 4, the input shaft is turned toward the left such that the control recesses or grooves of the A-side overlap with the grooves of the pressure supply region P. The B-side overlaps with the tank return line T. This overlapping practically extends over the entire length of the linear groove edges such that flow noise is largely prevented.

FIG. 5 shows a steering deflection in the opposite direction.

During the assembly of the steering valve shown, the relative position of the input shaft, the output shaft and the torsion rod is, after a hydraulic centering process, fixed with the aid of a centering pin 27 such that the hydraulic center is adjusted in this position.

FIGS. 6 and 7 show another embodiment of the invention. The input shaft 2 and the output shaft 3 comprise the previously described disk-shaped widenings 11, 12 that are provided with axial bores, control grooves, etc. An intermediate disk 21 is inserted between the two disk-shaped widenings 11, 12. In the embodiment according to FIG. 3, the intermediate disk can be connected to either the input shaft 2 or the output shaft 3 without rotational play by means of an adjusting pin, with the aforementioned connection being produced by means of an adjusting element with an electrorheological liquid in the embodiment according to FIG. 4. The adjusting pin 19 may, for example, be actuated by a mechanical actuator in dependence on the speed. However, this actuation may also take place as a function of the hydraulic pressure. The electrorheological adjusting element 20 essentially consists of an elastomer that contains chambers filled with an electrorheological liquid. Depending on the driving mode, one chamber is supplied with more or less current such that a defined viscosity change of the liquid takes place. The intermediate disk 21 may be variably connected to the input shaft or the output shaft in this fashion. Consequently, the transition between parking mode and the high-speed mode can be realized as desired. The intermediate disk 21 comprises identical or different control bores 22 that may be provided with identical or different control edges on the surfaces 23, 24.

FIG. 8 shows that an adjusting ring 25 is inserted into the intermediate disk 21. This adjusting ring comprises a bore 26 that forms the lead-through for an adjusting element. The intermediate disk 21 can be adjusted relative to the input shaft 2 and the output shaft 3 by turning the adjusting ring 25 relative to the intermediate disk.

A functional example is shown in FIG. 9. The grooves 15 and 16 arranged in the output shaft are connected to corresponding bores as is also the case with the groove 17 in the input shaft. The grooves provide the respective bores with corresponding control edges. If the input shaft and the output shaft are turned relative to one another, the grooves are moved such that they are situated congruently with their control edges and a corresponding flow of the hydraulic medium can be realized. The bores with the grooves 22a and 22b arranged in the intermediate disk cause a different control behavior as a function of to which shaft the intermediate disk is connected. If the intermediate disk is connected to the input shaft, i.e., the groove 17, a very small turning angle causes the control edges of the groove 22a to be closed by the groove 16 or the groove 22b to be closed by the groove 15 and consequently also a separation of the groove 17 from one of the two aforementioned grooves as a function of the turning direction. If the intermediate disk is connected to the output shaft, a corresponding turning angle must be overcome until the groove 17 is situated congruently with the grooves 22a or 22b and consequently one of the grooves 15 or 16.

The previously described embodiments disclose different options for conveying the pressure medium and controlling the valve, but the invention is not limited to these concrete embodiments.

List of reference numerals:
1 Steering valve
2 Input shaft
3 Output shaft
4 Torsion rod
5 Connection
6 Pin
7 Seal
8 Seal
9 Seal
10 Seal
11 Disk-shaped widening
12 Disk-shaped widening
13 Axial bore
14 Constriction
15 Groove
16 Groove
17 Groove
18 Groove
19 Adjusting pin
20 Adjusting element
21 Intermediate disk
22a Control grooves
22b Control grooves
23 Surface
24 Surface
25 Adjusting ring
26 Bore for adjusting element
27 Centering pin
28 Axial bore
29 Axial bore

I claim:

1. Rotary slide steering valve (1) for supplying an actuator with hydraulic pressure, having an input shaft (2), an output shaft (3), a centering spring element (4) connected to the input shaft (2) and to the output shaft (3) and a valve element, wherein the valve element comprises at least two elements that can be turned relative to one another and comprise control bores for supplying and returning a hydraulic medium as well as a hydraulic medium line to and a hydraulic medium return line from both sides of the actuator, wherein all control bores of the valve element which are assigned to one another are exclusively arranged within a region of opposing end faces of the input shaft (2) and the output shaft (3) and directly connected to pressure medium connections on a housing side of the rotary slide steering valve, wherein the input shaft (2) and the output shaft (3) comprise a disk-shaped widening (11, 12) within the region of the opposing end faces, and wherein control recesses (15, 16, 17, 18) are arranged on the opposing end faces, characterized by the fact that axial bores (13, 28, 29) are arranged in the opposing end faces.

2. Rotary slide steering valve (1) according to claim 1, characterized by the fact that the axial bores (13, 28, 29) are connected to bores that form hydraulic lines.

3. Rotary slide steering valve (1) according to claim 2, characterized by the fact that the bores that form hydraulic lines are axial bores.

4. Rotary slide steering valve according to claim 1, characterized by the fact that the control recesses (15, 16, 17, 18) have linear edges that essentially extend in the radial direction.

5. Rotary slide steering valve according to claim 4, characterized by the fact that the essentially radial, linear edges of control recesses (15, 16, 17, 18) situated adjacent to one another essentially extend parallel to one another.

6. Rotary slide steering valve according to claim 2, characterized by the fact that the relative turning angle between the input shaft (2) and the output shaft (3) is limited by a positive contour between the two shafts.

7. A steering valve for directing hydraulic fluid from a hydraulic fluid source to a first side of a hydraulic actuator in a vehicle steering system and for directing fluid from a second side of the hydraulic actuator to a hydraulic fluid return tank, said steering valve comprising:

a rotatable first shaft having a first end portion comprising a first face valve member, said first face valve member including a first plurality of axial bores (29) for fluidly connecting to the first side of the hydraulic actuator, said first face valve member including a radially extending first surface having a first plurality of control recesses (18) and a second plurality of control recesses (17), said first plurality of control recesses (18) being fluidly connected with said first plurality of axial bores (29);

a rotatable second shaft having a second end portion comprising a second face valve member, said second face valve member including a radially extending second surface lying parallel to and engaging said first end surface of said first face valve member, said second face valve member including a second plurality of axial bores (28) for fluidly connecting to the second side of the hydraulic actuator and a third plurality of axial bores (13) for fluidly connecting with the hydraulic fluid return tank, said second plurality of axial bores (28) being fluidly connected with said second plurality of control recesses (17) in said first face of said first face valve member, said second surface of said second face valve member having a third plurality of control recesses (15) for fluidly connecting with the hydraulic fluid source and a fourth plurality of control recesses (16) fluidly connected with said third plurality of axial bores (13); and a torsion bar having oppositely disposed first and second ends, said first end being connected to said first shaft and said second end being connected to said second shaft, said torsion bar permitting limited relative rotation between said first and second face valve members;

said first and second face valve members being relatively rotatable to fluidly connect said third plurality of control recesses (15) in said second face valve member with one of said first and second pluralities of control recesses (17, 18) and to fluidly connect said fourth plurality of control recesses (16) with the other of said first and second pluralities of control recesses (17, 18).

8. The steering valve of claim 7 wherein said first shaft comprises an input shaft and said second shaft comprises an output shaft.

9. The steering valve of claim 8 wherein said first end portion of said first shaft is a disk-shaped widened portion of said input shaft and said second end portion of said second shaft is a disk-shaped widened portion of said output shaft.

10. The steering valve of claim 7 wherein each control recess in said first, second, third and fourth pluralities of control recesses is defined by radially extending linear control edges, a portion of said control edges overlapping an adjacent portion of said control edges during relative rotation of said first and second face valve members.

* * * * *